US008582429B2

(12) United States Patent
Wang et al.

(10) Patent No.: US 8,582,429 B2
(45) Date of Patent: Nov. 12, 2013

(54) RESOURCE ALLOCATION AND SIGNALINGS FOR GROUP SCHEDULING IN WIRELESS COMMUNICATIONS

(75) Inventors: Jin Wang, Central Islip, NY (US); Peter S. Wang, E. Setauket, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 934 days.

(21) Appl. No.: 12/048,089

(22) Filed: Mar. 13, 2008

(65) Prior Publication Data

US 2008/0225783 A1    Sep. 18, 2008

Related U.S. Application Data

(60) Provisional application No. 60/895,085, filed on Mar. 15, 2007.

(51) Int. Cl.
*H04J 1/16*    (2006.01)

(52) U.S. Cl.
USPC ............................................ 370/230; 370/310

(58) Field of Classification Search
USPC ......... 370/230, 238, 252, 310, 328, 329, 330, 370/341, 346, 347, 348, 431, 432, 437, 449
See application file for complete search history.

(56) References Cited

U.S. PATENT DOCUMENTS

| 2008/0062936 | A1* | 3/2008 | He et al. ........................ 370/338 |
| 2008/0165698 | A1* | 7/2008 | Dalsgaard et al. ............ 370/252 |
| 2010/0067479 | A1* | 3/2010 | Choi et al. ..................... 370/330 |

FOREIGN PATENT DOCUMENTS

| WO | 2004/064426 | 7/2004 |
| WO | 2006/114689 | 11/2006 |
| WO | 2007/117757 | 10/2007 |

OTHER PUBLICATIONS

Ericsson, "Scheduling for Maximizing VoIP Capacity", TSG-RAN WG2 Meeting #56bis, R2-070055, (Sorento, Italy, Jan. 15-19, 2007).
Motorola, "Control Signalling Considerations", 3GPP TSG-RAN WG2 LTE Ad-Hoc, R2-061995, (Cannes, France, Jun. 27-30, 2006).
Motorola, "R1-061734 Scheduling for Voice", 3GPP TSG RAN WG2 LTE AdHoc, R2-061994, (Cannes, Jun. 27-30, 2006).
Nokia, "Signalling Control Overhead Due to Scheduling", 3GPP TSG-RAN WG2 Ad-Hoc on LTE, R2-061976, (Cannes, France, Jun. 27-30, 2006).
Qualcomm Europe, "Considerations for Control Signalling Support of Real Time Services", 3GPP TSG-RAN WG1 LTE Ad Hoc, R1-060173, (Helsinki, Finland, Jan. 23-25, 2006).
Third Generation Partnership Project, "Technical Specification Group Radio Access Network; Feasibility Study for Evolved UTRA and UTRAN (Release 7)", 3GPP TR 25-912 V0.1.7, (Jun. 2006).
Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912 V7.1.0, (Sep. 2006).

(Continued)

*Primary Examiner* — Dady Chery
(74) *Attorney, Agent, or Firm* — Eric Berkowitz

(57) ABSTRACT

Method and apparatus for resource allocation formatting, signaling, and procedures in wireless communications, the method reducing signal overhead. Wireless transmit/receive units are divided into one or more semi-static groups. Resource allocation takes place to a group and the resource sets are signaled to an individual unit needing the resources. The method is applied to resource allocation for services, including both real time and non real time services.

23 Claims, 8 Drawing Sheets

(56) References Cited

OTHER PUBLICATIONS

Third Generation Partnership Project, "Technical Specification Group Radio Access Network; Feasibility Study for Evolved Universal Terrestrial Radio Access (UTRA) and Universal Terrestrial Radio Access Network (UTRAN) (Relase 7)", 3GPP TR 25.912 V7.2.0, (Jun. 2007).

Third Generation Partnership Project, "Technical Specification Group Radio Access Network; Requirements for Evolved UTRA (E-UTRA) and Evolved UTRAN (E-UTRAN) (Release 7)", 3GPP TR 25.913 V7.3.0 (Mar. 2006).

Third Generation Partnership Project, "Technical Specification Group Radio Access Network; Physical Layer Aspects for Evolved Universal Terrestrial Radio Access (UTRA) (Release 7)", 3GPP TR 25.814 V7.1.0 (Sep. 2006).

Jiang et al., "Principle and Performance of Semi-persistent Scheduling for VoIP in LTE System," International Conference on Wireless Communications, Networking, and Mobile Computing, pp. 2861-2864 (Sep. 2007).

Klein et al., "Frame Descriptor Tables for Minimized Signaling Overhead in Beyond 3G MAC Protocols," European Wireless Conference, vol. 1, pp. 260-265 (Apr. 2005).

Third Generation Partnership Project, "Technical Specification Group Radio Access Network; Feasibility Study for Evolved UTRA and UTRAN (Release 7)", 3GPP TR 25.912 V0.1.7, (Jun. 2006).

Third Generation Partnership Project, "Technical Specification Group Radio Access Network; Feasibility Study for Evolved Universal Terrestrial Radio Access (UTRA) and Universal Terrestrial Radio Access Network (UTRAN) (Release 7)", 3GPP TR 25.912 V7.2.0, (Jun. 2007).

\* cited by examiner

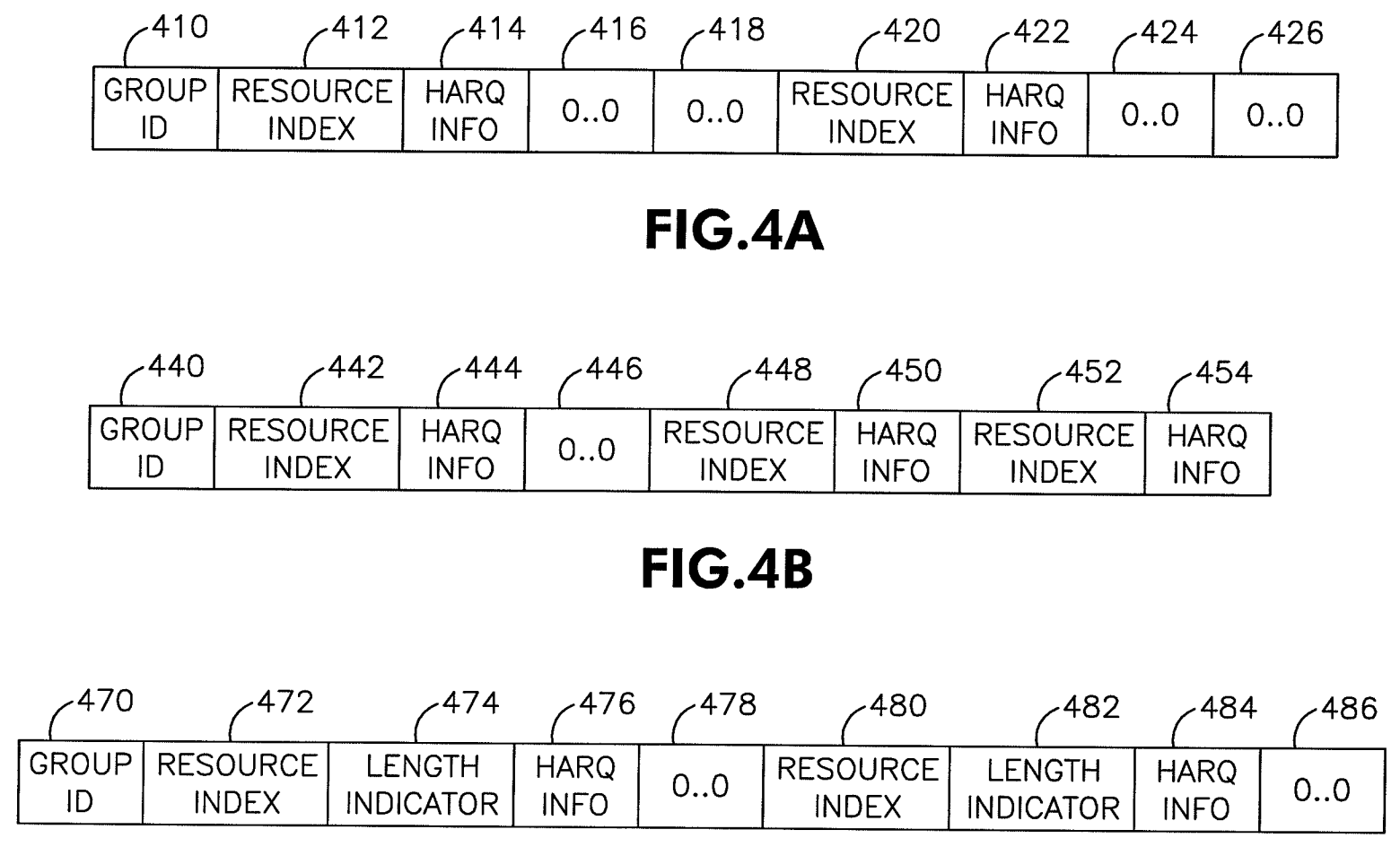

| 410 | 412 | 414 | 416 | 418 | 420 | 422 | 424 | 426 |
|---|---|---|---|---|---|---|---|---|
| GROUP ID | RESOURCE INDEX | HARQ INFO | 0..0 | 0..0 | RESOURCE INDEX | HARQ INFO | 0..0 | 0..0 |

FIG.4A

| 440 | 442 | 444 | 446 | 448 | 450 | 452 | 454 |
|---|---|---|---|---|---|---|---|
| GROUP ID | RESOURCE INDEX | HARQ INFO | 0..0 | RESOURCE INDEX | HARQ INFO | RESOURCE INDEX | HARQ INFO |

FIG.4B

| 470 | 472 | 474 | 476 | 478 | 480 | 482 | 484 | 486 |
|---|---|---|---|---|---|---|---|---|
| GROUP ID | RESOURCE INDEX | LENGTH INDICATOR | HARQ INFO | 0..0 | RESOURCE INDEX | LENGTH INDICATOR | HARQ INFO | 0..0 |

FIG.4C

RESOURCE ALLOCATION AND SIGNALINGS FOR GROUP SCHEDULING IN WIRELESS COMMUNICATIONS

CROSS REFERENCE TO RELATED APPLICATIONS

This application claims the benefit of U.S. provisional application No. U.S. 60/895,085 and having a filing date of Mar. 15, 2007, which is incorporated by reference as if fully, set forth.

FIELD OF INVENTION

This application is related to wireless communications.

BACKGROUND

The objective of Evolved Universal Terrestrial Radio Access (E-UTRA) and Universal Mobile Telecommunications System (UMTS) Terrestrial Radio Access Network (UTRAN) is to develop a radio access network toward a high-data-rate, low-latency, packet-optimized system with improved system capacity and coverage. In the evolution of UMTS, a new project called 3GPP LTE (Long Term Evolution) within the Third Generation Partnership Project (3GPP) has been proposed to cope with future requirements of UMTS. LTE has introduced new schemes on the air interface for the uplink and downlink transmissions: Orthogonal Frequency Division Multiple Access (OFDMA) for the downlink and Frequency Division Multiple Access (FDMA) for the uplink.

LTE needs have compelled system designers to search for ways to increase channel capacity including increasing communications efficiency over the radio interface between radio networks and mobile units. A large portion of the radio bandwidth available at this interface is allocated to carrying substantive traffic between mobile stations and the radio network. However, there is also a large amount of control information that must be transmitted between mobile stations and the radio network to perform various operations such as mobile registration, call setup, handover, etc. Some of these operations occur quite frequently. Where possible, it is desirable to reduce the volume and frequency of such signaling to increase the amount of radio bandwidth available for substantive traffic, (i.e., increased system capacity).

For real time services such as Voice over Internet Protocol (VoIP), the search for ways to increase channel capacity has led to an increase in L1/L2 control channel overhead and is undesirable. It is to this end, as well as others, that there is a need for managing the resource allocation and signaling for group scheduling in wireless communications.

There are two schedulers in the E-UTRAN Node B (eNB) allocating physical resources; one for the uplink and one for downlink. The schedulers grant the right to transmit on a per User Equipment (UE) basis. The resource assignment comprises of physical resource blocks (PRBs) and a modulating and coding scheme (MCS). These resources are allocated for one or multiple Transmission Time Intervals (TTIs). A PRB is a sub band of the frequency domain during one TTI in the time domain.

The characteristics of real time services, such as VoIP with small packets and constant inter-arrival time, make the baseline scheduling alternatives less suitable. With dynamic scheduling, many small packets result in a great deal of overhead. On the other hand, persistent scheduling uses less signaling but uses the bandwidth inefficiently during silent periods, which are common during voice communication. To better utilize the resources with less signaling overhead, the strategy of group scheduling and non-persistent scheduling is suggested. Both approaches take advantage of the silent periods which are frequent in VoIP and have less signaling overhead than dynamic scheduling.

Group scheduling is a non-dynamic scheduling approach where users are divided into groups that get scheduled dynamically. Within a group, the UEs are assigned resources using a set of predefined formats. The formats define how the resources are divided between the UEs.

Non-persistent scheduling uses predefined allocations, but switches dynamically between silent periods and talk-spurts. Retransmissions are scheduled dynamically and on any available resource. In downlink, the eNB can avoid collisions by not transmitting to more than one UE at a time. This means that transitions between talk and silent periods can be done without reassigning persistent resources. Dynamic scheduling of these resources can still be allowed for another UE during silent periods without collisions.

In uplink however, the predefined resource cannot be used by another UE since it is not known when the predefined resource will be used for transmission. Different methods to perform signal switching between silent periods and talk spurts have therefore been suggested.

Group scheduling has been proposed to provide semi-dynamic scheduling for VoIP services that can solve the problems of voice activity change and Hybrid Automatic Repeat Request (HARQ) retransmission collision problems. The improvement for group scheduling has been proposed to adapt to link conditions and HARQ operations such as asynchronous HARQ for VoIP services. The resource index table proposed to be used for group scheduling is shown in FIG. 1.

If the user's application requires sporadic resources, (such as Hypertext Transport Protocol (HTTP) traffic), the system resources are best utilized if they are assigned on an "as needed" basis. In that case, the resources are explicitly assigned and signaled by the layer 1 control channel. If the type of service that the user is carrying out or the Quality of Service (QoS) profile of a user or application requires periodic or continuous allocation of resources, (such as VoIP), then periodic or continuous signaling of assigned Physical (PHY) resources may be avoided if persistent allocations are allowed. Persistent allocations are those PHY resource assignments that are valid as long as an explicit de-allocation is not made. The objective of having persistent scheduling is to reduce L1/L2 control channel overhead especially for VoIP traffic.

Providing persistent and non-persistent resource allocations are required for an efficient support of different types of data-transfer applications. The PHY resources assignments in the downlink (DL) of E-UTRA can be made valid for either a predetermined duration of time (non-persistent assignments) or an undetermined duration of time (persistent assignments). Since the assignment messages may target both the intended recipient of the assignment as well as any current owner of the resources specified by the assignment, they may be multicast. The control channel structure should allow for a UE to decode control channel messages targeting other UEs. However, there are several drawbacks that have been encountered when group scheduling is used for VoIP services on LTE system.

When different UEs are grouped for VoIP, use of a resource allocation table for signaling is necessary. But this will inevitably bring more signaling overhead if all resource related information has to be signaled through Radio Resource Control (RRC) signaling, which is a very inefficient way of allocating resources. Additionally, when only some of the UEs within one group are using VoIP services, there is no efficient resource allocation method such that only those UEs that are using VoIP resources are allocated resources.

For all group scheduling proposals, there are no operating procedures or signaling specified when real time (RT) and non-real time (NRT) services are supported simultaneously. There are also no operating procedures or signaling specified when one or more UEs finish their VoIP service early within a group. In addition, there are no operating procedures or signaling specified when one or more UEs need the new VoIP service within a cell.

To adapt to link conditions in current systems, an increasing amount of radio resources are allocated to a group of UEs in the resource allocation table. Consequently, if all radio resources in one allocation table are used, then it will be a waste of resources as they are dedicated only to that particular group of UEs.

It is possible that one or more UEs may finish their VoIP service and terminate their association within a group for a long period, (not the VoIP silent period), or that one or more UEs may need new VoIP services and need new grouping management, and existing methods do not provide for efficient allocation of resources for such a scenario.

SUMMARY

A method is proposed for implementing an efficient format and mode of signaling for a resource allocation table and grant/assignment scheduling, the methods divides the information contained in a resource allocation table into several parts such that the L1/L2 channel overhead is reduced. The method relates to groupings that are not static and can be changing in a semi-static way. In this manner of grouping, the same radio resources can be assigned to the WTRUs within the same group and, in turn, efficient resource utilization can be achieved. Alternatively, the resources allocated to a dramatically changing WTRU in one group can be re-allocated through L1/2 signaling. Optionally, several WTRU groups can share one resource allocation table and this table can be signaled to reduce the signaling overhead.

BRIEF DESCRIPTION OF THE DRAWINGS

A more detailed understanding may be had from the following description, given by way of example in conjunction with the accompanying drawings wherein:

FIGS. 4A, 4B, and 4C show embodiments of resource assignment for group scheduling.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Although LTE is used as a specific example hereafter, the teachings herein can also be applied to High Speed Packet Access (HSPA+) system when similar services and concepts are supported. The method is well suited to services that require constant or approximately constant bit rates. Additionally, although VoIP is used as a specific example, the invention is not so limited and may be applied to any real time services like streaming video, etc.

There are two problems to address for resource allocation signaling. The first is how to format and signal the resource allocation table efficiently. The second is how to signal the allocation of the WTRUs within one group based on the resource allocation efficiently. Each of these problems is addressed and it is ensured that group scheduling remains an efficient means for resource management for real time services like VoIP.

There are four different parts to the method as described hereafter. The first part describes efficient formatting of the resource allocation table. The second part describes different ways of signaling of the resource allocation table once it has been formatted. The third part describes different ways in which resources which is originally reserved for real time services are allocated for non real time services. The fourth part describes procedures and signaling when WTRUs change services or initiate services. These parts individually and together describe resource allocation and signaling for scheduling real time and non real time services in wireless communications.

I. Efficient Formatting of Resource Allocation Table

Figure 1:
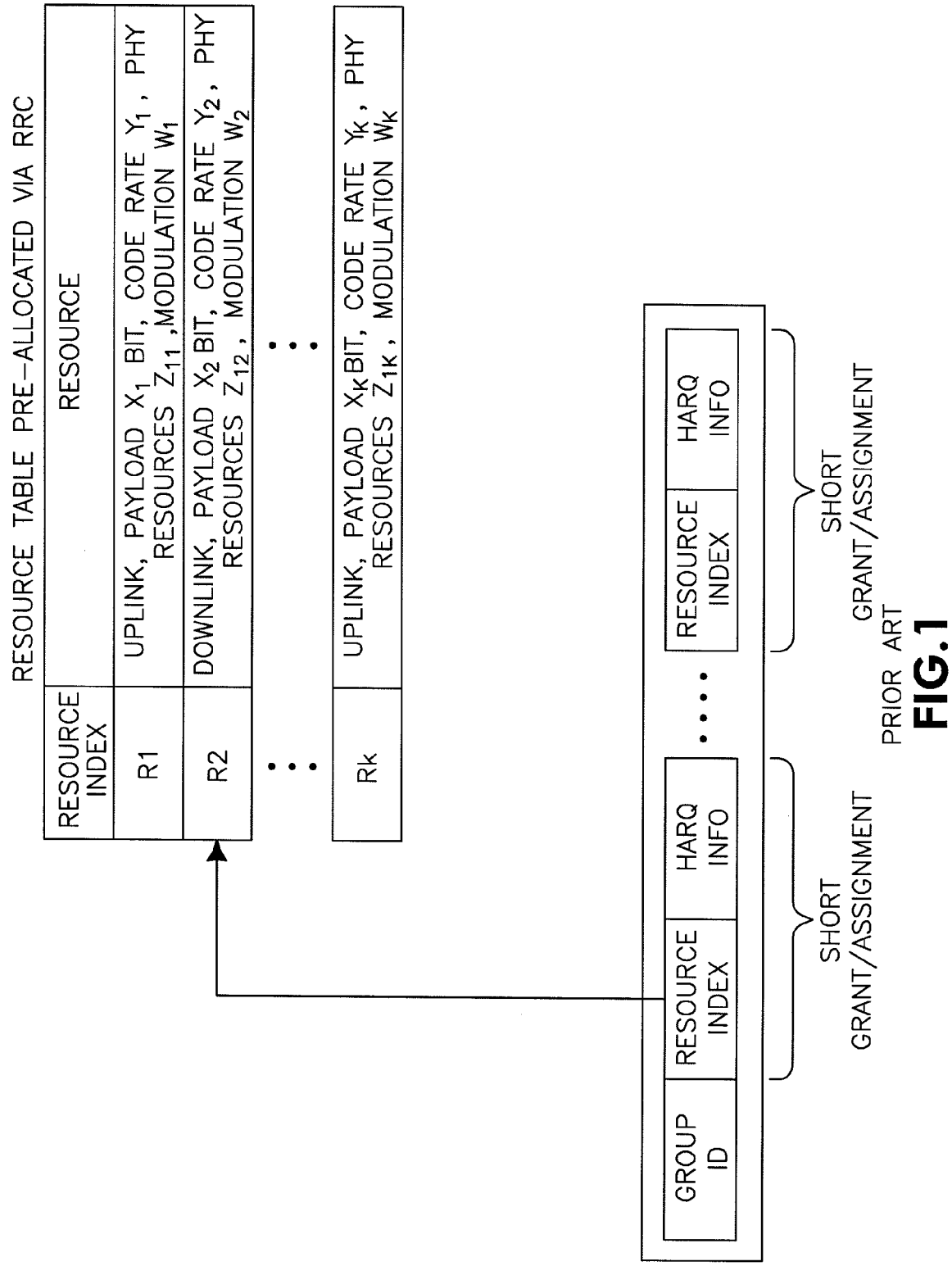
FIG. 1 is a prior art example of semi-dynamic scheduling.

FIG. 1 shows a typical resource index table which is used for group scheduling. In the resource table pre-allocated via RRC for each WTRU, the resources corresponding to the resource indexes are expressed by the payload bits, code rate, modulation, PHY resources and indication for whether the allocation is for UL or DL. While it is beneficial, this format of resource table will result in significant signaling overhead if all information as expressed in the table needs to be signaled through RRC message. What is needed is a method by which the signaling overhead can be reduced.

The method as set forth hereinafter minimizes the signaling overhead, by way of the use of a two level resource allocation table format and corresponding signaling method.

Figure 2:
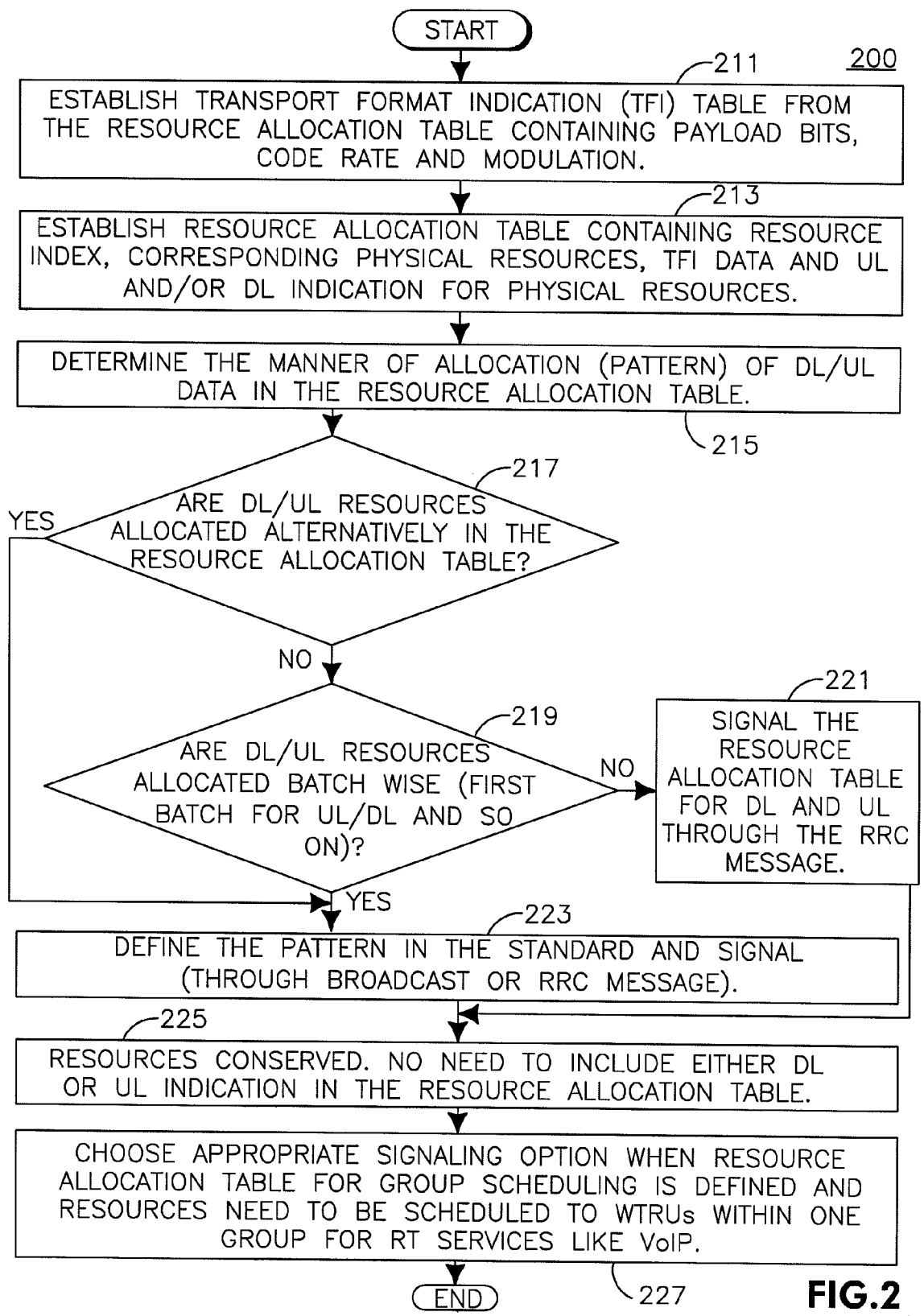
FIG. 2 is a flow diagram for the method performed by the invention.
Figure 3:
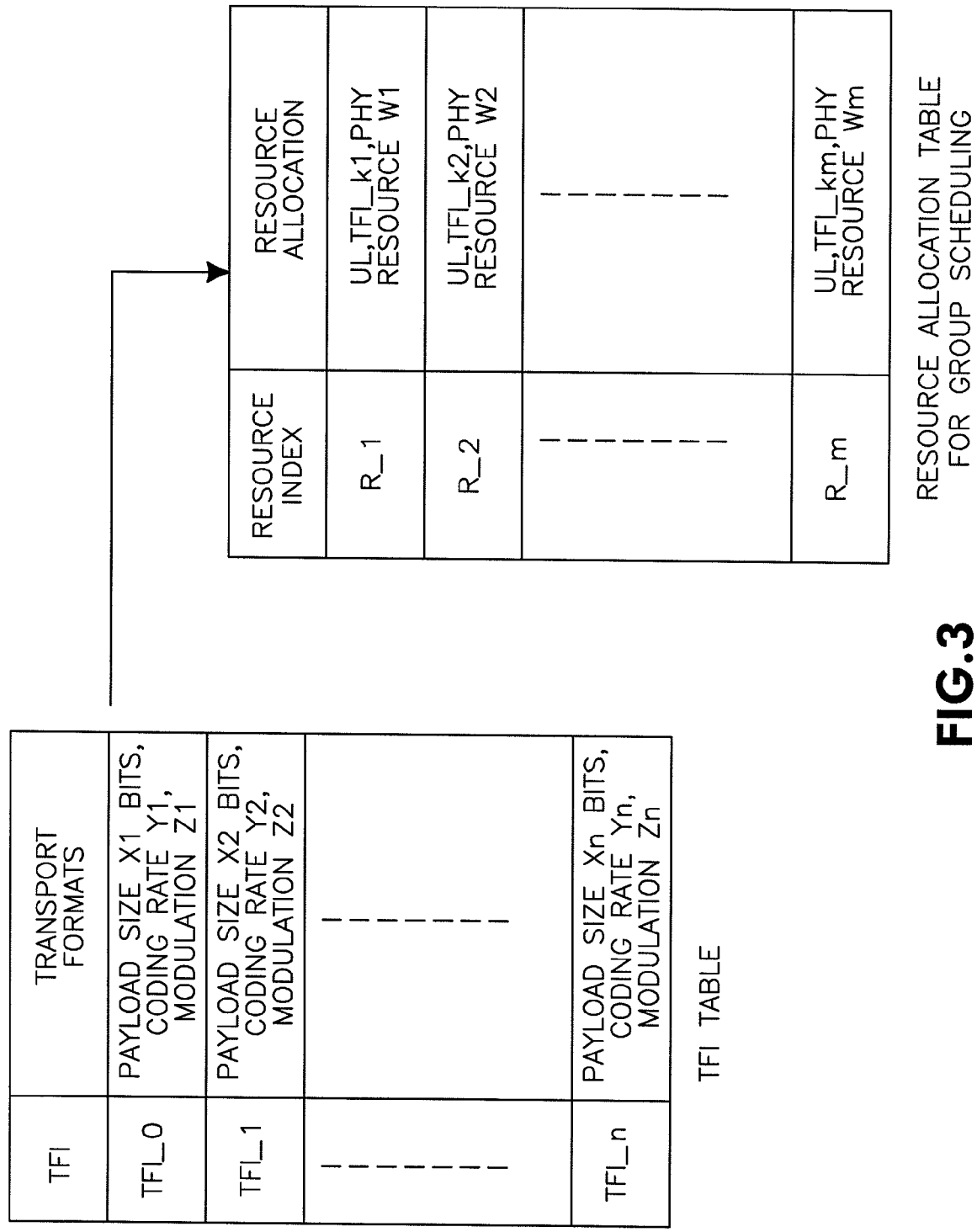
FIG. 3 shows an embodiment of resource allocation for group scheduling according to the present invention.

FIG. 2 shows a flow diagram of a method 200 for achieving the efficient resource allocation. The proposed transport format indication and resource allocation methods shown in FIG. 2 and 3 are generic and they can be used for either dynamic scheduling or persistent scheduling and a special case of persistent scheduling is the group scheduling. Instead of putting all transport format information such as payload bits, code rate and modulation, physical resource information and so on, corresponding to each index in a single table, two tables are created as shown in step 211. Step 211 is described further in FIG. 3. The first table is a transport format indication (TFI) table which lists the combination of TFIs and its corresponding TF including payload bits, code rate and modulation, etc, which is relatively static. All or most of the transport format combinations are included for all WTRUs inside this TFI table. This table can be standardized between an E-UTRAN Node B (eNB) (base station) and a WTRU and thus there is no need for signaling it over the air which can greatly reduce the signaling overhead. Alternatively, this table can be signaled through broadcast message, for example through dynamic broadcast message (D-BCH) since this table contains the TF information for all WTRUs, or this table can be signaled through RRC signaling in case the table is updated for a specific WTRU.

Once the TFI is generated and signaled (or established), a Resource Allocation Table for different groups of WTRUs is established as provided in step 213. This table also can be established and then signaled. This table contains a resource index and corresponding transport formats and UL and/or DL indication for the physical resources. The corresponding transport formats can be expressed by TFI defined in the TFI table which is known to WTRUs through methods proposed in the preceding paragraph. This scheme is illustrated in the flow diagram as shown in FIG. 2 as an embodiment.

To further reduce the signaling overhead, the manner of allocation of DL/UL data in the Resource Allocation Table is determined as provided in Step 215. To achieve this, the pattern in which DL/UL resources are allocated must be known for efficient allocation as shown in Steps 217 and 219. In case the physical resources are not allocated in a pattern, the table can be signaled through the RRC message (Step 221). Once the table is signaled, there is no need to indicate the DL or UL indication in the table as it is already standardized by formats (Step 225). In case the resources are already being signaled in a pattern, then that pattern is defined and then signaled via a broadcast message (if to a group of WTRUs) or through a RRC message (if to an individual WTRU) (Steps 223 and 227).

Instead of having a single table that contains all the data such as UL/DL information, payload size, code rate, physical resources and modulation, the data is split up into two separate tables, a transport format indicator table and a resource allocation table as shown in FIG. 3.

If UL and DL resources are allocated alternatively inside the resource allocation table (Step 217) and this pattern can be defined in the standard (Step 223), signaled through either broadcast message or through the RRC message together or before signaling this table, then there is no need to include the UL or DL indication in the table (225). For example if it is specified in standard in advance that the first resource index is always for UL (or DL) and then DL (or UL), then there is no need to signal these index into the table as shown in FIG. 3.

Alternatively, the first batch (half) of resource indexes can be for UL (or DL) and second batch of resource indexes can be for DL (or UL) (Step 217). If this allocation sequence is specified in standard in advance then there is no need to include UL or DL indication in the table, this allocation sequence can also be signaled through either broadcast message or in the RRC message before signaling this table. Alternatively, the UL and DL indication can be placed at the beginning of each batch of resource indexes (Step 219).

Alternatively, the resource allocation table for UL and DL can be signaled separately through the RRC message (Step 223), with one indication indicating whether that table is for UL or DL.

II. Efficient Signaling of Resource Assignment for Group Scheduling

The following describes signaling options for resource assignment when resource allocation table for group scheduling have been defined and the resources need to be scheduled to WTRUs within one group for VoIP services. The resource assignment as shown in FIG. 2 is through the L1/L2 signaling, e.g. Packet Data Control Channel (PDCCH), it is optional to use L2/L3, e.g. MAC or RRC signaling to achieve the resource assignment. Three signaling options are preferable for resource assignment of group scheduling. Options 1 and 2 assume that the length for resource index and HARQ information parts are fixed and the same for all WTRUs with the group. Option 3 assumes that the length for resource index of each WTRU is fixed and length for HARQ information part may be variable (e.g. sync or async HARQ information can be assigned simultaneously within one group of WTRUs). Table 1 summarizes the signaling options preferable for resource assignment.

TABLE 1

| Option | Resource index | HARQ information |
|--------|----------------|------------------|
| 1      | Fixed          | Fixed            |
| 2      | Fixed          | Fixed            |
| 3      | Fixed          | Fixed/Variable   |

1) Option 1: A signaling packet contains a Group ID, Resource Index and HARQ information. Referring to the packet signaling scheme in FIG. 4A, the first part of the signaled packet is group ID 410; after that is the resource index 412 and then HARQ information 414 for each WTRU according to the position sequence signaled before through the RRC signaling. The lengths for resource index and HARQ information can be the same or different, but each length is fixed for all WTRUs within one group. If there is no assignment for certain WTRUs within one group then the relevant parts for those WTRUs resource indexes 416 and HARQ information 418 can be set as zeros. The initial or retransmission information should be reflected into the HARQ information part.

2) Option 2: Referring to the packet signaling scheme in FIG. 4B, the first part of the signaled packet is group ID 440 followed by the resource assignment 442 for each WTRU. The resource assignment for each WTRU includes resource index and/or HARQ information with fixed length for each part and has the same length for all WTRUs within the group.

Option 2 differs from Option 1 because when there is no resource assignment for certain WTRUs within a group, then the resource index for those WTRUs is set to zero. In option 1, both the resource information and HARQ information have to be set at zeros for WTRUs in a group having no assignment; whereas in Option 2, just the resource index is set as zeros. In Option 2, when there is no resource assignment for certain WTRUs within a group, then the resource indexes 446 are set as zeros, and consequently there is no need to set the HARQ information part 448 as zeros and attach that part after the resource index part. In this way if the WTRU reads zeros from resource index part, then the WTRU would realize that there is no HARQ information part after that, then the WTRU can read the next resource index part until it goes to the position for that WTRU for its assignment.

3) Option 3: Referring to the scheme in FIG. 4C, the first part is group ID 470, then is the resource assignment 472 for each WTRU. For resource assignment, a length indicator 474 is added besides resource index and HARQ information part for each WTRU. This length indicator can be before the resource indicator or between resource index and HARQ information parts as shown. The length of the length indicator for HARQ information can be fixed. The WTRU will read the HARQ information part according to the length specified in the length indicator part. If the length indicator is after the resource index part, then just as in option 2, when the resource index part is set at zero, then there is no need to attach the length indicator and HARQ information parts after the resource index part.

The use of the options as described can greatly reduce the signaling overhead.

III. Resource Allocation for Non Real Time (NRT) Services

The physical resources allocated in the resource allocation table for group scheduling of VoIP services can also be used and allocated for NRT services through dynamic scheduling and even to other VoIP services that may not be in any WTRU groups when these resources are available for scheduling.

Figure 5:
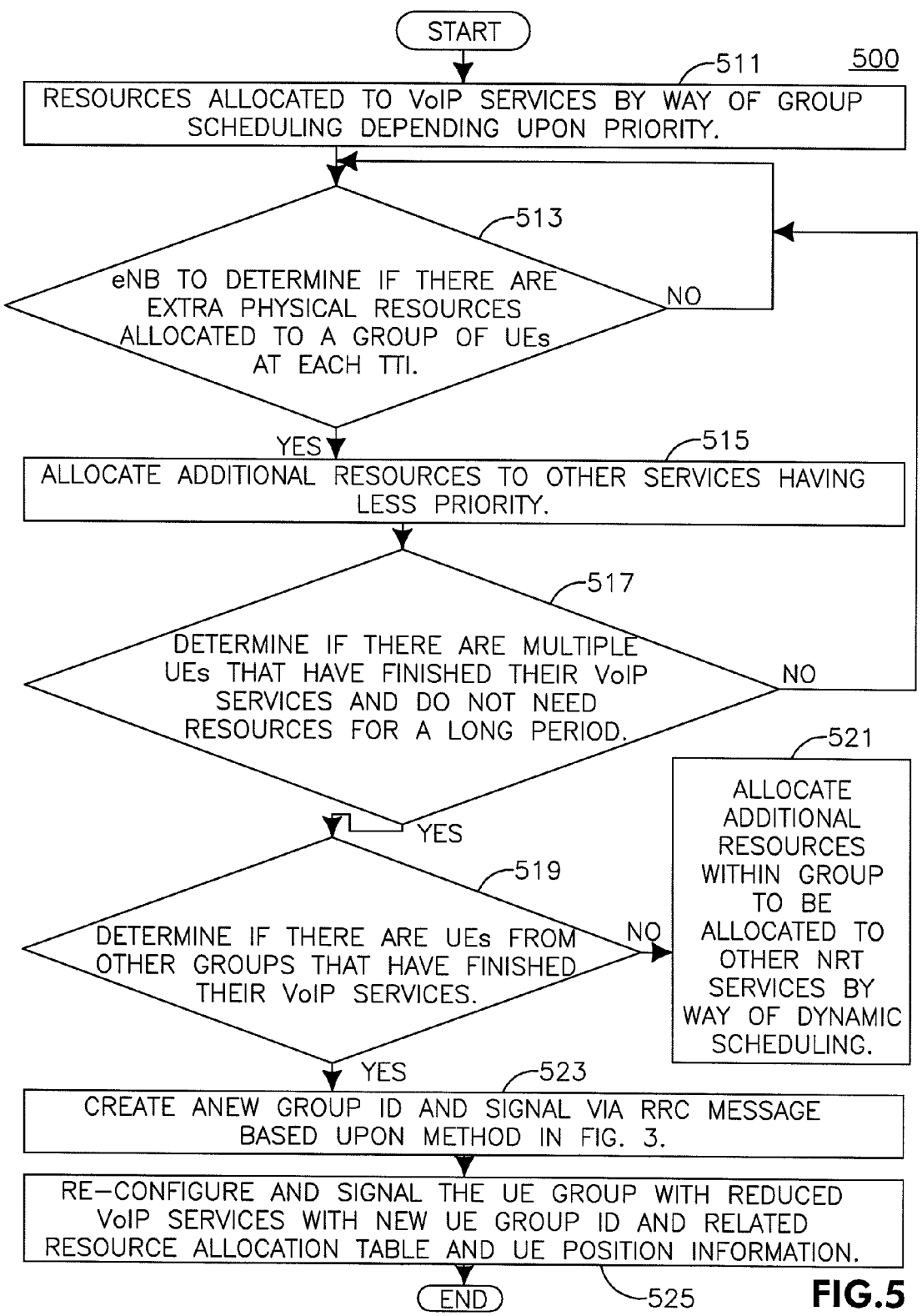
FIG. 5 shows a flow diagram of a method to efficiently format and signal a resource allocation table.

FIG. 5 shows a flow diagram showing a method of resource allocation for NRT and other services. When using group scheduling, the physical resources allocated in advance can be either less or more than the number of WTRUs within one group. If more resources are allocated for a group of WTRUs, then the extra radio resources that are not used by the WTRUs within one group are allocated to other WTRUs or services (Step 511) (e.g. non-real time services which need dynamic scheduling); if less physical resources are available for allocation to the WTRUs within one group then extra resources outside the resource allocation table should be allocated to WTRUs within the group through dynamic scheduling.

When resources are allocated to VoIP services by group scheduling, then at each Transmission Time Interval (TTI) the E-UTRAN Node B (eNB) (base station) should examine if these resources are needed by VoIP services based on the number of VoIP services for initial transmission, HARQ retransmission or link adaptation requirements, etc (step 513). If there are extra physical resources allocated in the resource allocation table for a group of WTRUs that are not used in one TTI, then these resources can be allocated to other services such as NRT services (Step 515). But the resources in the allocation table are preferably used for VoIP services as the highest priority in each TTI.

If one (or more than one) WTRU within a group finishes its VoIP service and may not need the resources for very long period (e.g. t TTI after the VoIP service) or one (or more than one) WTRU within a group finishes its talk-spurt state and transits to silent period, then one of the following resource allocation procedures depending upon the WTRUs that do not need resources are performed. The procedures are summarized in Table 2.

TABLE 2

| Procedure | When Performed | Nature of procedure |
| --- | --- | --- |
| 1 | Relatively small number of WTRUs finish VoIP services. | Resource allocation table remains unchanged. No re-grouping of WTRUs. |
| 2. | A large number of WTRUs finish VoIP services. | New group of WTRUs that have finished services created. |
| 3. | A small number of WTRUs in a group finish VoIP and a large number of WTRUs in a different group finish VoIP services. | New group created from WTRUs that have finished VoIP services from both groups. |

Procedure 1: Small number of WTRUs finish the VoIP services: The resource allocation table remains unchanged and there is no need to re-group the rest of WTRUs and do the signaling.

If only very few WTRUs finish the VoIP services or transit from talk-spurt to silent states (step 517) then there is no need to re-configure the resource allocation table and re-configure the WTRU group which can save the RRC signaling. But the extra resources within this WTRU group's resource allocation table can be allocated to other services (Step 521), for example they can be allocated to NRT services through dynamic scheduling or can be allocated to other WTRU groups that may need extra resources or to newly established WTRU groups, or allocate to WTRUs not in any groups for either RT or NRT services.

When certain resources of a group k (with one or more than one WTRU finished with VoIP service) are allocated to other groups of WTRUs then they can not be used by group k although there is no need to re-configure and re-signal the resource allocation table for group k due to the reduction of small number of WTRUs. Alternatively, some arbitration should be done by the eNB between different WTRU groups for the resource contention.

Procedure 2: WTRU Group k is combined with reduced VoIP services with other WTRU group(s).

If there are other WTRU group(s) that may also have WTRUs that have finished their VoIP services, in this situation if WTRUs from group k and other group(s) can add up to a number that is reasonable to construct a new WTRU group (s), a WTRU group is constructed with the rest of the WTRUs in group k and WTRUs from other group(s) (Step 519). In this embodiment, it is preferable to use either the group ID of any of the groups that participate in the merging or to have a new WTRU group ID. The new WTRU group ID along with all WTRU IDs, related resource allocation table, and WTRU's positions for assignment are signaled via RRC message based on the methods proposed earlier (Step 523).

The possibility of adding new WTRUs that require VoIP services to the WTRU group with reduced number of VoIP services are discussed in procedure 3.

Procedure 3: Re-configure and signal the WTRU group that has reduced VoIP services (WTRUs) with new WTRU group ID and related resource allocation table and WTRU position information.

If a situation such as link adaptation condition changes to certain degree and the resource for this WTRU group (even with reduced WTRUs) has to be re-allocated to make resource scheduling in a more efficient way, then eNB has to evaluate (Step 525) and decide to re-configure the resource allocation table and re-signal the new WTRU group ID and updated resource allocation table along with the WTRU positions for assignment according the procedures described above.

IV. Procedures and Signaling when UE(s) Change Services i.e. Initiate Services During Group Scheduling Process.

Figure 6:
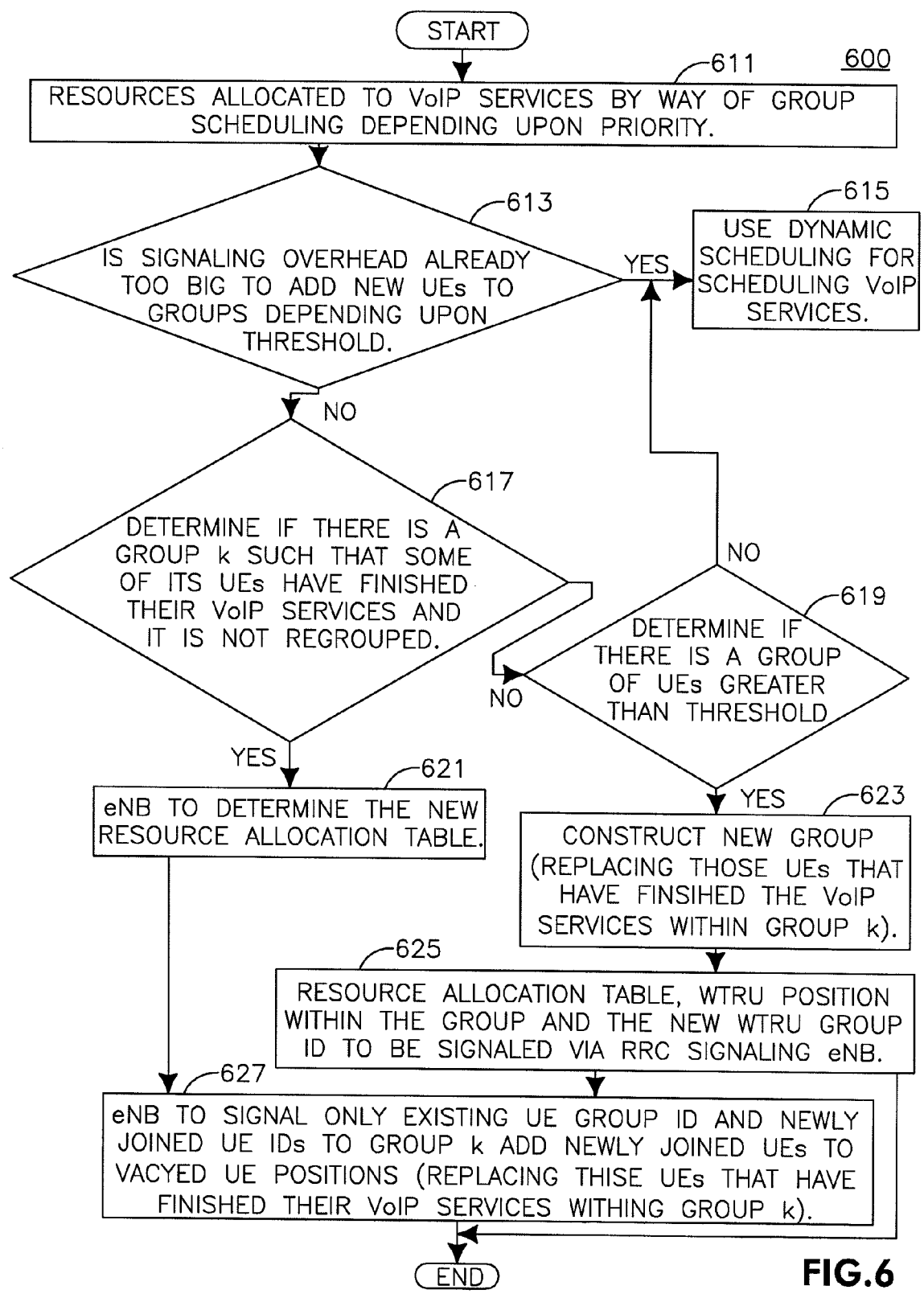
FIG. 6 shows a flow diagram of the procedures and signaling when UE(s) change services during group scheduling process.

If one or more than one WTRU needs to initiate new VoIP service, then either of the following options as described in FIG. 6 is applied. The procedures are summarized in Table 3.

TABLE 3

| Procedure | When Performed | Nature of procedure |
| --- | --- | --- |
| A. | A small number of WTRUs need to initiate new services and other groups are relatively stable. | Dynamic Scheduling performed. |
| B. | A part of an existing group has finished services and is not regrouped. | New group of WTRUs that have finished services created. |
| C. | WTRUs that require new services exceed a defined threshold. | New group created. |

Procedure A: Dynamic scheduling—If there is only one or a small number (this number can be defined as a threshold) of WTRUs requiring VoIP services (Step 611) and other WTRU groups are relative stable which means other WTRU groups either do not have WTRUs that finish their VoIP services earlier or only one or small number (this number can be defined as a threshold) of WTRUs finish their VoIP service earlier, and if the signaling overhead is too big to add the new WTRUs requiring VoIP services to other groups to construct a new group (step 613), then dynamic scheduling can be used for scheduling VoIP services for these WTRUs (Step 615).

Procedure B: Group with other WTRU group(s)—If one group k is in a situation where one or some WTRUs are already finished with their VoIP services and it is not regrouped, then the new VoIP services of WTRUs can be added to this group k (step 617). The possible triggers for this option can be: if situations of many WTRUs in group k have already changed and the resource allocation table needs to be updated, or there are more than a certain number (this number can be defined as a threshold) of WTRUs already finished with their VoIP services and the number of new WTRUs requiring VoIP services is large enough to construct a new group with WTRUs in group k. In this way, the eNB determines the new resource allocation table (Step 621). In order to reduce signaling overhead, instead of signaling WTRU group ID along with all WTRU ID's, the eNB can just signal the existing WTRU group ID and the newly joined WTRU IDs to the newly joined WTRUs to group k. Also, newly joined WTRUs are added to those WTRU positions that have already finished their VoIP services within group k. In this way only WTRU positions for newly added WTRUs need to be signaled through RRC message (Step 627). Alternatively, the resource allocation table can be maintained the same as before but the new WTRU group ID with newly added WTRUs and their positions within this group are signaled in RRC message to the WTRUs to form the new group.

Procedure C: Group WTRUs requiring new VoIP services together—If the number of WTRUs requiring VoIP services exceed certain number (step 619) (this number can be defined as a threshold) and no criteria as described in B is met to group with other WTRU group(s), then these WTRUs can construct a new WTRU group (Step 623). The resource allocation table, WTRU position within the group and the new WTRU group ID should be signaled via RRC signaling by eNB (Step 625).

Figure 7:
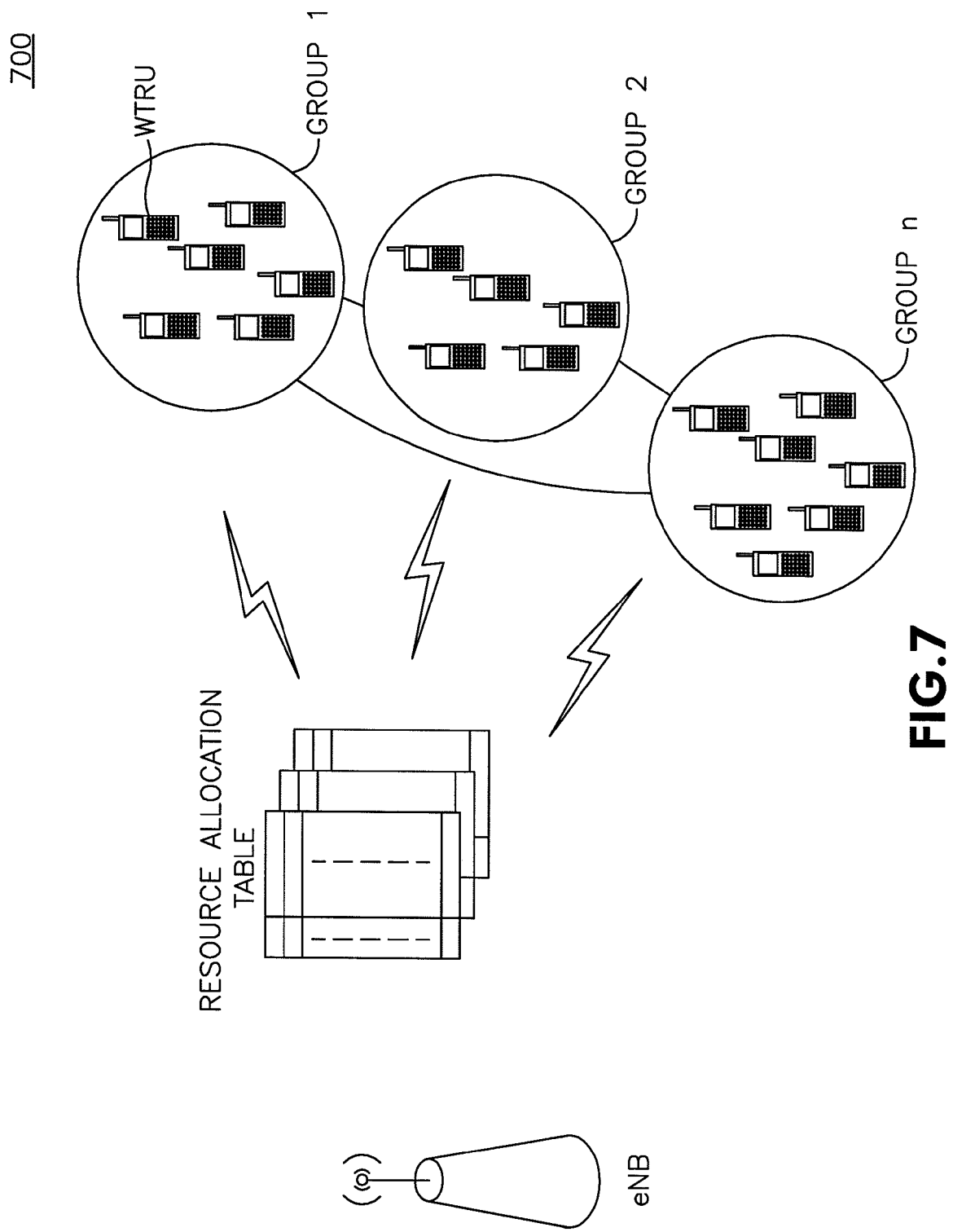
FIG. 7 depicts a generic block diagram of UEs grouped in a semi-static way and a resource allocation table being signaled to the groups of UEs.

FIG. 7 illustrates a generic block diagram of WTRUs grouped in a semi-static way and a resource allocation table being signaled to various groups of WTRUs by the eNB.

Figure 8:
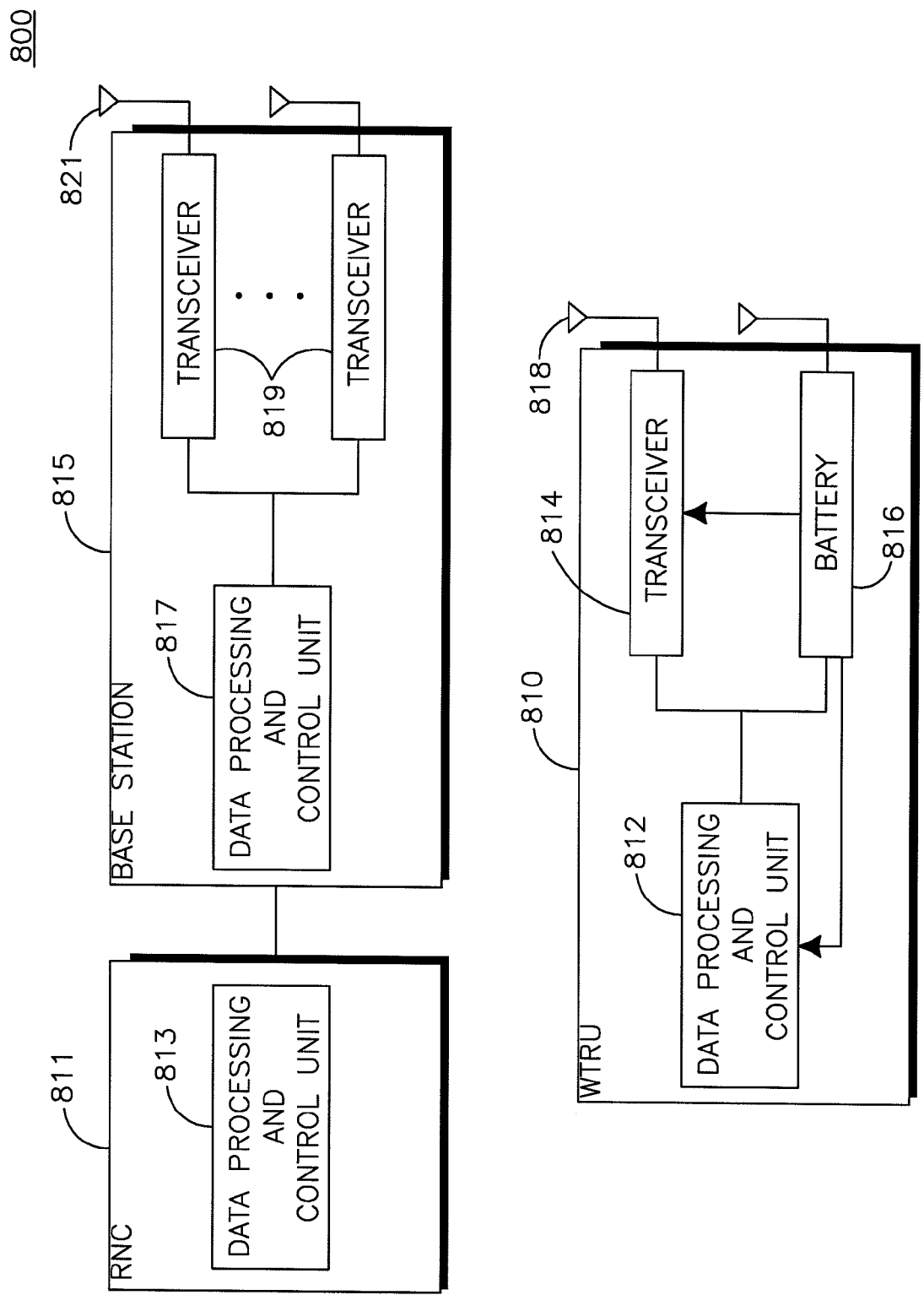
FIG. 8 is a functional block diagram of a base station and plurality of UEs shown in FIG. 7.

In FIG. 8, a radio network controller (RNC), a base station (BS) or eNB and a WTRU are shown. The RNC 811 and base station 815 shown in FIG. 8 are wireless network nodes that each includes a corresponding data processing and control unit 813 and 817 for performing numerous wireless and data processing operations required to conduct communications between the RNC 811 and the WTRU 810. Part of the equipment controlled by the base station data processing and control unit 817 includes a plurality of wireless transceivers 819 connected to one or more antennas 821. The WTRU 810 shown in FIG. 8 also includes a data processing and control unit 812 for controlling the various operations required by the WTRU. The WTRU's data processing and control unit 812 provides control signals as well as data to a wireless transceiver 814 connected to an antenna 818. Both the data processing and control unit 812 and transceiver 814 are powered from voltage supplied by battery 816. The amount of power supplied by the battery 816 to the data processing and control unit 812 and transceiver 814 is regulated by one or more control signals from the data processing and control unit 812.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for allocating resources to a plurality of Wireless Transmit/Receive Units (WTRUs) comprising:
dividing the WTRUs into two or more semi-static groups for semi-persistent scheduling;
allocating a set of resources to each of the semi-static groups, information for each set of resources being partitioned in a transport format indication (TFI) table including one or more TFIs and a resource allocation table (RAT) including a resource index, wherein the RAT further includes one or more references to one or more entries in the TFI table and at least two of the semi-static groups share the TFI table; and
signaling the allocated resources associated with each respective WTRU to the respective WTRU needing the allocated resources in each group.

2. The method of claim 1, wherein the TFI table comprises transport format indication information which is common to all WTRUs including any of payload bits, code rate or modulation.

3. The method of claim 1, wherein the TFI table is standardized between a base station and the WTRU.

4. The method of claim 1, wherein the TFI table is signaled through a broadcast message.

5. The method of claim 1, wherein the TFI table is updated and signaled through radio resource control (RRC) signaling for a group of WTRUs.

6. The method of claim 1, wherein the TFI table is signaled to a specific WTRU via radio resource control (RRC) signaling.

7. The method of claim 1, wherein the TFI table is predefined and known to all WTRUs in standard without signaling.

8. The method of claim 1, wherein the RAT comprises one or more resource indexes and physical resources corresponding to each resource index.

9. The method of claim 1, further comprising allocating, in the RAT, an uplink (UL) or downlink (DL) indication corresponding to each resource index, wherein the UL and DL allocations are stored in an alternating pattern and the pattern is signaled.

10. A method for allocating resources to a plurality of WTRUs in a pattern, the pattern comprising:
    allocating resource indexes in a first batch to UL and allocating resource indexes in a second batch to DL, which is pre-defined; and
    a second level resource allocation table for UL and a second level resource allocation table for DL are signaled separately,
    the signaling step comprising:
    signaling a group ID to identify a group;
    signaling a position sequence;
    signaling a resource index, error correction information and null resource allocation information for each WTRU in the group needing a resource index and error correction information, the resource index indicating the set of resources, each WTRU being identified according to the position sequence; and
    transmitting a length indicator that sets a variable length of the error correction information,
    wherein the null resource allocation information for each WTRU in the group includes a null resource information bit associated with each WTRU in the group to indicate whether the WTRU has a resource allocation.

11. The method of claim 10, wherein the error correction information comprises Hybrid Automatic Repeat Request (HARQ).

12. The method of claim 10, wherein a length for the resource index and HARQ information are fixed and the same for all WTRUs within the group.

13. A method for allocating resources to a plurality of WTRUs in a pattern, the pattern comprising:
    allocating resource indexes in a first batch to UL and allocating resource indexes in a second batch to DL, which is pre-defined; and
    a second level resource allocation table for UL and a second level resource allocation table for DL are signaled separately,
    the signaling step comprising:
    signaling a group ID to identify a group;
    signaling a position sequence;
    signaling a resource index, error correction information and null resource allocation information for each WTRU in the group needing a resource index and error correction information, the resource index indicating the set of resources, each WTRU being identified according to the position sequence; and
    transmitting a length indicator that sets a variable length of the error correction information,
    wherein no valid resource index and HARQ information for a WTRU are signaled and the positions for both resource index and error correction information are filled with pre-defined bit pattern upon lack of resource assignment for the WTRU.

14. A method for allocating resources to a plurality of WTRUs in a pattern, the pattern comprising:
    allocating resource indexes in a first batch to UL and allocating resource indexes in a second batch to DL, which is pre-defined; and
    a second level resource allocation table for UL and a second level resource allocation table for DL are signaled separately,
    the signaling step comprising:
    signaling a group ID to identify a group;
    signaling a position sequence;
    signaling a resource index, error correction information and null resource allocation information for each WTRU in the group needing a resource index and error correction information, the resource index indicating the set of resources, each WTRU being identified according to the position sequence; and
    transmitting a length indicator that sets a variable length of the error correction information,
    wherein no valid resource index and error correction information for a WTRU are signaled and only one position either resource index or HARQ information is filled with pre-defined bit pattern upon lack of resource assignment for the WTRU.

15. A method for allocating resources to a plurality of wireless transmit/receive units (WTRUs) comprising:
    dividing the plurality of WTRUs into two or more semi-static groups for semi-persistent scheduling of the WTRUs;
    allocating a first set of resources for use by a first service to a first one of the two or more semi-static groups and a second set of resources for use by a second service to a second one of the two or more semi-static groups;
    periodically determining whether the first set of resources include extra resources not used to satisfy requirements of the first service; and
    reallocating resources assigned to at least the first set of resources when the first set of resources are determined to include the extra resources not used to satisfy requirements of the first service.

16. The method of claim 15, wherein the reallocating of the resources assigned to at least the first set of resources includes reallocating the extra resources not being used by the first service to the second one or a further one of the semi-static groups or to both.

17. The method of claim 15, further comprising forming another semi-static group of the two or more semi-static groups for use by WTRUs that are not using the first or second sets of resources.

18. The method of claim 15, further comprising reconfiguring a resource allocation table.

19. The method of claim 15, further comprising signaling a new identification (ID) for the second one of the semi-static groups.

20. The method of claim 15, further comprising adding to a third semi-static group one or more WTRUs of the two or more semi-static groups that need to initiate the first or second service.

21. The method of claim 20 further comprising reconfiguring a resource allocation table associated with the third semi-static group to include resources for use by the first or second service.

22. The method of claim 15 further comprising constructing a new group of WTRUs if a number of WTRUs in an existing group using the first service exceeds a threshold.

23. The method of claim 15, wherein the first and second services have constant or approximately constant bit rates and include at least one of Voice over Internet Protocol (VoIP) service or streaming service.

* * * * *

UNITED STATES PATENT AND TRADEMARK OFFICE
CERTIFICATE OF CORRECTION

| | | |
|---|---|---|
| PATENT NO. | : 8,582,429 B2 | Page 1 of 1 |
| APPLICATION NO. | : 12/048089 | |
| DATED | : November 12, 2013 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this
Second Day of December, 2014

Michelle K. Lee
*Deputy Director of the United States Patent and Trademark Office*